US010985650B2

(12) United States Patent
Zhang et al.

(10) Patent No.: US 10,985,650 B2
(45) Date of Patent: Apr. 20, 2021

(54) OPEN-LOOP CHARGE PUMP FOR INCREASING RIPPLE FREQUENCY OF OUTPUT VOLTAGE

(71) Applicant: Shanghai Awinic Technology Co., LTD, Shanghai (CN)

(72) Inventors: Haijun Zhang, Shanghai (CN); Shaojun Guan, Shanghai (CN); Ziqing Lu, Shanghai (CN)

(73) Assignee: Shanghai Awinic Technology Co., LTD, Shanghai (CN)

( * ) Notice: Subject to any disclaimer, the term of this patent is extended or adjusted under 35 U.S.C. 154(b) by 179 days.

(21) Appl. No.: 16/185,631

(22) Filed: Nov. 9, 2018

(65) Prior Publication Data
US 2019/0222119 A1 Jul. 18, 2019

(30) Foreign Application Priority Data

Jan. 16, 2018 (CN) .......................... 201810038898.X (51) Int. Cl.
*H02M 3/07* (2006.01)
*H02M 1/32* (2007.01)
*H02M 1/00* (2006.01)
(52) U.S. Cl.
CPC ............... *H02M 3/07* (2013.01); *H02M 1/32* (2013.01); *H02M 2001/0035* (2013.01)
(58) Field of Classification Search
CPC ............ H02M 3/07; H02M 1/32; H02M 1/08; H02M 2001/0035; H02J 7/0029; H02J 7/00308; H02J 7/00304
See application file for complete search history.

(56) References Cited

U.S. PATENT DOCUMENTS 8,860,472 B2    10/2014  Yuan
2002/0030539 A1  3/2002  Sher et al.
(Continued)

FOREIGN PATENT DOCUMENTS

CN    101673938 A    3/2010
CN    101739053 A    6/2010
(Continued)

OTHER PUBLICATIONS

First Chinese Office Action regarding Application No. 201810038898.X dated Aug. 1, 2019. Translation provided by Unitalen Attorneys at Law.

*Primary Examiner* — Kyle J Moody
*Assistant Examiner* — Jye-June Lee
(74) *Attorney, Agent, or Firm* — Harness, Dickey & Pierce, P.L.C.

(57) ABSTRACT

An open-loop charge pump is provided. In the open-loop charge pump, a peak current limiting control circuit is arranged between a control circuit and a boost circuit. The control circuit drives the peak current limiting control circuit based on an over-voltage protection signal to control the boost circuit to be in a charging phase continuously or in a normal operation mode. In a case that the output voltage is higher than an upper threshold voltage, the boost circuit is continuously in the charging phase and does not supply power to an output load, and an output capacitor is discharged to supply power to the output load. In a case that the output voltage is lower than a lower threshold voltage, the boost circuit is in the normal operation mode.

9 Claims, 4 Drawing Sheets

(56) References Cited

U.S. PATENT DOCUMENTS

2013/0300461 A1    11/2013  Yuan
2019/0190284 A1*  6/2019  Pinto ........................ H02M 3/07

FOREIGN PATENT DOCUMENTS

| CN | 102386893 A | | 3/2012 |
|----|-------------|---|--------|
| CN | 102684458 A | | 9/2012 |
| CN | 103095127 A | | 5/2013 |
| CN | 103856044 A | | 6/2014 |
| CN | 104883053 A | | 9/2015 |
| CN | 104953820 A | * | 9/2015 |

* cited by examiner

OPEN-LOOP CHARGE PUMP FOR INCREASING RIPPLE FREQUENCY OF OUTPUT VOLTAGE

This application claims the priority to Chinese Patent Application No. 201810038898.X, titled "OPEN-LOOP CHARGE PUMP", filed on Jan. 16, 2018 with the Chinese Patent Office, which is incorporated herein by reference in its entirety.

FIELD

The present disclosure relates to the technical field of integrated circuits, and in particular to an open-loop charge pump.

BACKGROUND

A charge bump, which is also referred to as a non-inductive direct current/direct current (DC/DC) converter, is a switch DC/DC converter in which a capacitor is used for power storage. In a portable electronic device powered by a battery, a boost charge pump circuit is often used as a power supply converter. Compared with an inductive DC/DC converter in which an inductor is used for power storage, the charge-pump type converter with no power inductor has smaller electromagnetic interference (EMI), occupies a smaller area on the board, and has lower system cost. The charge pumps are generally divided into voltage-stabilizing output type charge pumps and non-voltage-stabilizing output type charge pumps. In the voltage-stabilizing output type charge pump circuit, a close-loop control structure is usually adopted in which an output voltage of the charge pump circuit is sampled by using a dividing resistor to obtain a sampled voltage. The sampled voltage is compared with a preset standard voltage, and the output voltage is stabilized to a preset value by using a switch transistor for controlling the power of the charge pump in an output control circuit of an error amplifier. The switch transistor cannot be fully turned on under a gate voltage of the switch transistor, and the conduction impedance is not minimum, which affects the driving capability of the charge pump. Further, since a feedback loop exists in the close-loop charge pump, it is required to consider stability of the loop in the charge pump. In addition, the error amplifier is included in the close-loop charge pump, which results in large power consumption of the close-loop charge pump and a large area of an integrated chip.

In the open-loop charge pump, a gate voltage of the switch transistor can reach a power supply voltage and a ground voltage, and the conduction impedance can be minimum, while it is not required to perform loop control. Therefore, the open-loop charge pump is widely applied due to high efficiency and driving capability. The open-loop charge pump generally has a current limiting function and an over-voltage protection function, which ensures effective and reliable operation of the open-loop charge pump. During the operation of the open-loop charge pump, when the power supply voltage exceeds an over-voltage protection entering threshold for the charge pump, the open-loop charge pump enters an over-voltage protection mode, and a load is powered by an output capacitor. If a current of the load is small, it takes a long time for the output voltage to be decreased to an over-voltage protection exiting threshold. In this case, a ripple frequency of the output voltage is low and may fall in the audio frequency range (from 20 Hz to 20 KHz), which interferes an audio signal and generates audible noise.

SUMMARY

An open-loop charge pump is provided in the present disclosure, which can increase a ripple frequency of an output voltage and remove music noise of the open-loop charge pump, thereby improving audio quality.

The open-loop charge pump provided in the present disclosure includes: a control circuit, a boost circuit, an output voltage detection circuit, an over-voltage protection circuit, a peak current limiting control circuit, and a clock circuit. The control circuit includes a first input terminal and an output terminal. The boost circuit includes a control terminal and a load terminal. The load terminal of the boost circuit is connected to a load circuit including an output capacitor and an output load, and the load terminal of the boost circuit is connected to the first input terminal of the control circuit via the output voltage detection circuit and the over-voltage protection circuit. The output voltage detection circuit is configured to output a detection voltage based on an output voltage at the load terminal, and the over-voltage protection circuit is configured to output an over-voltage protection signal based on a reference voltage and the detection voltage. The output terminal of the control circuit is connected to the control terminal of the boost circuit via the peak current limiting control circuit. The control circuit drives the peak current limiting control circuit based on the over-voltage protection signal to control the boost circuit to be in a charging phase continuously or in a normal operation mode. In a case that the output voltage is higher than an upper threshold voltage, the boost circuit is continuously in the charging phase and does not supply power to the output load, and the output capacitor is discharged to supply power to the output load. In a case that the output voltage is lower than a lower threshold voltage, the boost circuit is in the normal operation mode. In a time period of the normal operation mode, the boost circuit switches between a discharging phase and the charging phase based on a frequency of the clock circuit. When the boost circuit switches from the charging phase to the discharging phase, the peak current limiting control circuit decreases a peak current outputted from the boost circuit to increase a ripple frequency of the output voltage.

In an embodiment, the peak current limiting control circuit includes: a first switch transistor, a second switch transistor, a third switch transistor and a single pulse generator. A gate of the first switch transistor is connected to the control terminal of the boost circuit, a first electrode of the first switch transistor is configured to receive a power supply voltage, and a second electrode of the first switch transistor is connected to the gate of the first switch transistor. A gate of the second switch transistor is connected to an output terminal of the single pulse generator, a first electrode of the second switch transistor is grounded, and a second electrode of the second switch transistor is connected to the second electrode of the first switch transistor. A gate of the third switch transistor is connected to the output terminal of the single pulse generator via a phase inverter, a first electrode of the third switch transistor is grounded, and a second electrode of the third switch transistor is connected to the second electrode of the first switch transistor via a current source. An input terminal of the phase inverter is connected to the output terminal of the single pulse generator, and an output terminal of the phase inverter is connected to the gate of the third switch transistor. An input terminal of the single pulse generator is connected to the output terminal of the control circuit.

In an embodiment, the first switch transistor is a P-channel Metal Oxide Semiconductor (PMOS) transistor, and both the second switch transistor and the third switch transistor are N-channel Metal Oxide Semiconductor (NMOS) transistors.

In an embodiment, the boost circuit includes a fourth switch transistor and a function circuit. A gate of the fourth switch transistor is the control terminal of the boost circuit, a first electrode of the fourth switch transistor is configured to receive the power supply voltage, and a second electrode of the fourth switch transistor is connected to the load circuit via the function circuit. The fourth switch transistor and the first switch transistor form a current mirror to limit an output current of the second electrode of the fourth switch transistor, so as to decrease the peak current.

In an embodiment, the fourth switch transistor is a PMOS transistor.

In an embodiment, the over-voltage protection circuit outputs the over-voltage protection signal having a high level in a case that the output voltage is higher than the upper threshold voltage, and outputs the over-voltage protection signal having a low level in a case that the output voltage is lower than the lower threshold voltage.

In an embodiment, in a case that the over-voltage protection circuit outputs the over-voltage protection signal having a high level, the control circuit controls, based on the over-voltage protection signal, the single pulse generator to output a positive pulse signal. The positive pulse signal is used to control the second switch transistor to be turned on, and the positive pulse signal is converted to a negative pulse signal via the phase inverter. The negative pulse signal is used to control the third switch transistor to be turned off, so as to control the fourth switch transistor to be in the charging phase.

In an embodiment, in a case that the over-voltage protection circuit outputs the over-voltage protection signal having a low level, the control circuit controls, based on the over-voltage protection signal, the single pulse generator to output a negative pulse signal. The negative pulse signal is used to control the second switch transistor to be turned off, and the negative pulse signal is converted to a positive pulse signal through via the phase inverter. The positive pulse signal is used to control the third switch transistor to be turned on such that the current source provides a current-limiting current for the current mirror, so as to decrease the peak current.

In an embodiment, the single pulse generator is configured to output a pulse signal having a signal width of 0.5 µs.

It can be seen from the above description that, in the open-loop charge pump provided according to the technical solution of the present disclosure, the peak current limiting control circuit is arranged between the control circuit and the boost circuit. The control circuit drives the peak current limiting control circuit based on the over-voltage protection signal to control the boost circuit to be in the charging phase continuously or in the normal operation mode. In a case that the output voltage is higher than the upper threshold voltage, the boost circuit is continuously in the charging phase and does not supply power to the output load, and the output capacitor is discharged to supply power to the output load. In a case that the output voltage is lower than the lower threshold voltage, the boost circuit is in the normal operation mode. In a time period of the normal operation mode, the boost circuit switches between the discharging phase and the charging phase based on the frequency of the clock circuit. When the boost circuit switches from the charging phase to the discharging phase, the peak current limiting control circuit decreases the peak current outputted from the boost circuit to increase the ripple frequency of the output voltage. In this way, the music noise, which is caused by the ripple frequency of the output voltage of the charge pump being in an audio frequency range, can be avoided, thereby improving the audio quality.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

The technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. Any other embodiments obtained by those skilled in the art based on the embodiments of the present disclosure without any creative work fall within the protection scope of the present disclosure.

Figure 1:
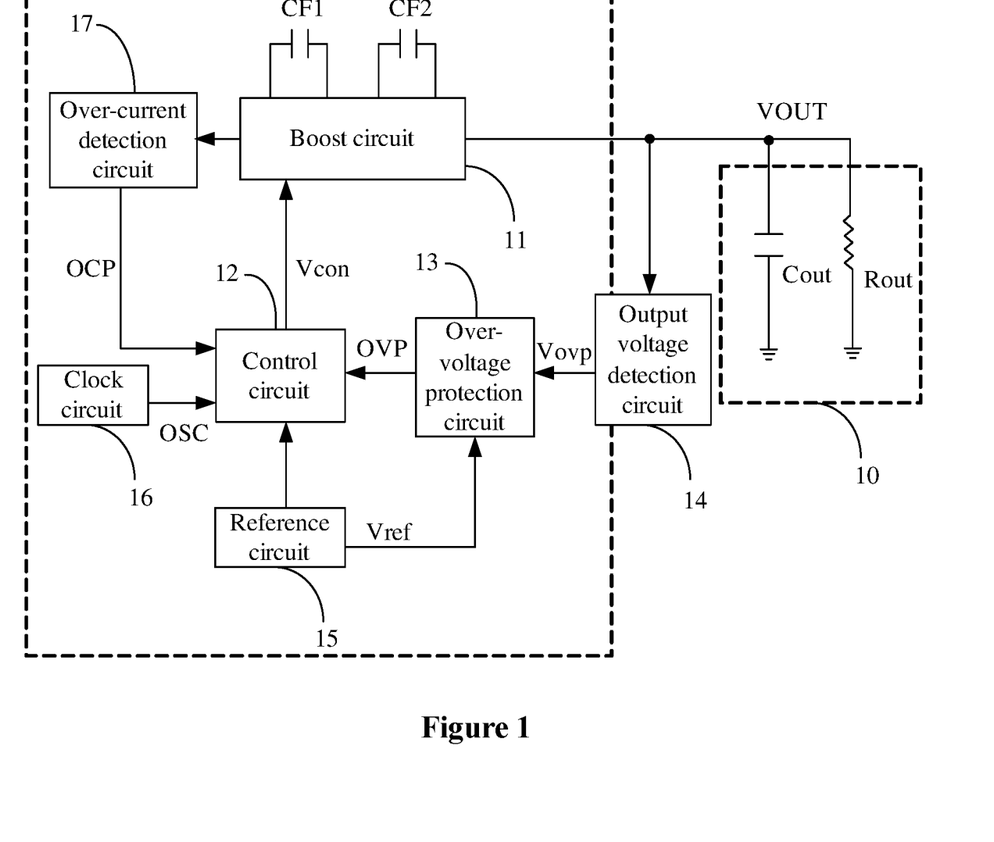
FIG. 1 is a schematic circuit diagram of an open-loop charge pump.
Figure 2:
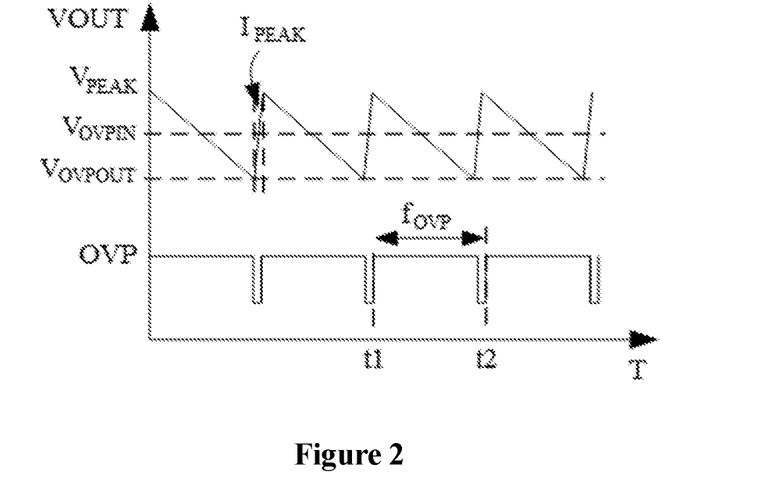
FIG. 2 is a timing diagram illustrating a voltage of the open-loop charge pump shown in FIG. 1.

Reference is made to FIG. 1 and FIG. 2. FIG. 1 is a schematic circuit diagram of an open-loop charge pump, and FIG. 2 is a timing diagram illustrating a voltage of the open-loop charge pump shown in FIG. 1. The open-loop charge pump includes: an output voltage detection circuit 14, an over-voltage protection circuit 13, a control circuit 12, a clock circuit 16, a boost circuit 11, an over-current detection circuit 17 and a reference circuit 15. The boost circuit 11 provides an output voltage VOUT to a load circuit 10.

The output voltage detection circuit 14 generates a detection voltage Vovp for the over-voltage protection circuit 13 by dividing the output voltage with resistors. The over-voltage protection circuit 13 compares a reference voltage Vref with the detection voltage Vovp, and then generates an over-voltage protection signal OVP. The over-voltage protection signal OVP is inputted to the control circuit 12. The control circuit 12 determines whether the boost circuit 11 is in a normal operation mode or in an over-voltage protection mode based on the over-voltage protection signal OVP. The clock circuit 16 generates a switch clock signal OSC for the control circuit 12 and the boost circuit 11. Under a sequence condition corresponding to the clock signal OSC, the control circuit 12 generates a boost control signal Vcon based on the over-voltage protection signal OVP. The boost control signal Vcon is used to control a switch transistor in the boost circuit 11 to be turned on or turned off, so as to charge or discharge flying capacitors CF1 and CF2 in the open-loop charge pump and generate the output voltage VOUT.

In the open-loop charge pump shown in FIG. 1, since no closed loop is provided for controlling the output voltage, the over-voltage protection circuit 13 and the output voltage detection circuit 14 are required to detect the output voltage VOUT. When the output voltage VOUT exceeds an upper threshold voltage $V_{OVIPN}$, the over-voltage protection circuit 13 controls the open-loop charge pump to enter the over-voltage protection mode and generates the over-voltage protection signal OVP having a high level. The over-voltage protection signal OVP is inputted to the control circuit 12 such that the control circuit 12 generates the boost control signal Vcon. The switch transistor in the boost circuit 11 is in a charging phase under control of the boost control signal Vcon, and does not supply power to an output load Rout. In this case, the output load Rout is powered by an output capacitor Cout, and the output voltage VOUT of the boost circuit 11 is gradually decreased. When the output voltage VOUT is decreased to a lower threshold voltage $V_{OVPOUT}$, the over-voltage protection signal OVP changes to a low level, and the open-loop charge pump operates normally, and the output voltage VOUT is increased.

In the open-loop charge pump shown in FIG. 1, since a transient peak current of the switch transistor of the boost circuit 11 is uncontrolled when the open-loop charge pump exits the over-voltage protection mode, a large peak current completely flows to the output capacitor Cout. In this case, a ripple amplitude of the output voltage of the open-loop charge pump is increased, which results in a decreased ripple frequency of the output voltage, music noise in the audio frequency range, and poor audio quality.

The open-loop charge pump shown in FIG. 1 has the following disadvantages. In a case that the open-loop charge pump is in the over-voltage protection mode, the switch transistor in the boost circuit 11 is in the charging phase or is turned off, and the output load Rout is powered by the output capacitor Cout. Further, when the open-loop charge pump exits the over-voltage protection mode, a large transient peak current IPEAK of the switch transistor, which is generally up to 2 A, completely flows to the output capacitor Cout, the output voltage VOUT is increased, and the highest voltage of the output voltage VOUT is increased, and thus the ripple amplitude of the output voltage VOUT is increased. In this case, the over-voltage protection circuit 13 outputs the over-voltage protection signal OVP to control the open-loop charge pump to be in the over-voltage protection mode. As shown in FIG. 2, as a current in the load circuit 10 become small, the output voltage VOUT is gradually decreased from a peak voltage, which results in the decreased ripple frequency of the output voltage, music noise in the audio frequency range, and the poor audio quality.

In an embodiment of the present disclosure, a peak current liming control module is added to the open-loop charge pump shown in FIG. 1, to solve the above problem.

In order to make the above objects, features and advantages of the present disclosure more clear, the present disclosure is further described in detail in conjunction with the drawings and specific embodiments.

Figure 3:
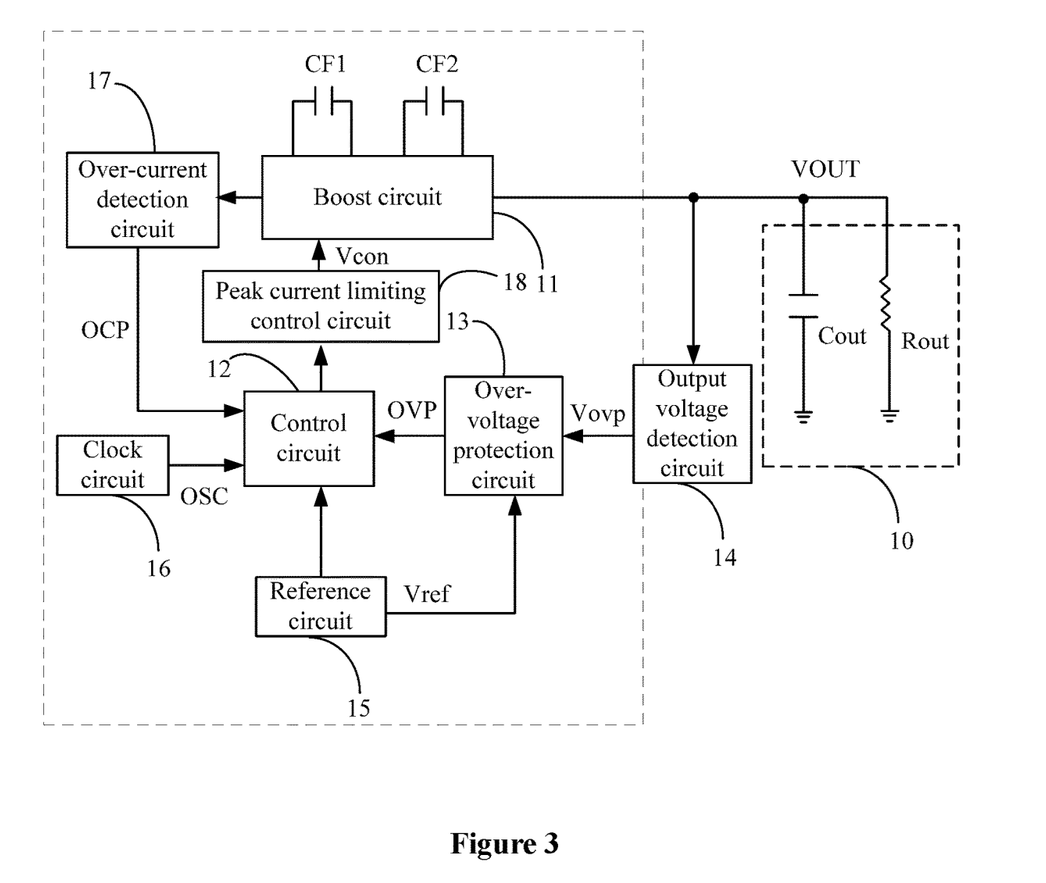
FIG. 3 is a schematic circuit diagram of an open-loop charge pump for increasing a ripple frequency of an output voltage according to an embodiment of the present disclosure.

Reference is made to FIG. 3, which is a schematic circuit diagram of an open-loop charge pump for increasing a ripple frequency of an output voltage according to an embodiment of the present disclosure. The open-loop charge pump shown in FIG. 3 includes a control circuit 12 and a boost circuit 11. The control circuit 12 includes a first input terminal and an output terminal. The boost circuit 11 includes a control terminal and a load terminal.

The load terminal of the boost circuit 11 is connected to a load circuit 10. The load circuit 10 includes an output capacitor Cout and an output load Rout. The load terminal of the boost circuit 11 is connected to the first input terminal of the control circuit 12 via an output voltage detection circuit 14 and an over-voltage protection circuit 13.

The output voltage detection circuit 14 is configured to output a detection voltage Vovp based on an output voltage VOUT at the load terminal. The over-voltage protection circuit 13 is configured to output an over-voltage protection signal OVP based on a reference voltage Vref and the detection voltage Vovp.

The output terminal of the control circuit 12 is connected to the control terminal of the boost circuit 11 via a peak current limiting control circuit 18. The control circuit 12 drives the peak current limiting control circuit 18 based on the over-voltage protection signal OVP to control the boost circuit 11 to be in a charging phase continuously or in a normal operation mode.

In a case that the output voltage VOUT is higher than an upper threshold voltage $V_{OPVIN}$, the boost circuit 11 is in the charging phase and does not supply power to the output load Rout, and the output capacitor Cout is discharged to supply power to the output load Rout. In a case that the output voltage VOUT is lower than a lower threshold voltage $V_{OVPOUT}$, the boost circuit 11 is in the normal operation mode. In a time period of the normal operation mode, the boost circuit 11 switches between a discharging phase and the charging phase based on a frequency of a clock circuit. When the boost circuit 11 switches from the charging phase to the discharging phase, the peak current limiting control circuit 18 is used to decrease a peak current outputted from the boost circuit 11 to increase a ripple frequency of the output voltage VOUT.

In the open-loop charge pump shown in FIG. 3, the boost circuit 11 further includes an over-current detection terminal, and the control circuit 12 further includes a second input terminal. The over-current detection terminal is connected to the second input terminal via an over-current detection circuit 17. The over-current detection circuit 17 is used to detect a current of the boost circuit 11, generate a current detection signal OCP based on a current detection result, and transmit the current detection signal OCP to the control circuit 12.

The control circuit 12 further includes a third input terminal. The third input terminal is connected to a clock circuit 16. The clock circuit 16 generates a switch clock signal OSC for the control circuit 12 and the boost circuit 11.

The control circuit 12 further includes a fourth input terminal. The fourth input terminal is connected to a reference circuit 15. The reference circuit 15 is used to provide the reference voltage Vref for the over-voltage protection circuit 13.

In the embodiment shown in FIG. 3, the peak current limiting control circuit 18 is added to the open-loop charge pump shown in FIG. 1, which solves the problem of the poor audio quality caused by the extremely low ripple frequency of the output voltage VOUT. When the output voltage VOUT exceeds the upper threshold voltage $V_{OVPIN}$, the generated over-voltage protection signal OVP is a high level. The over-voltage protection signal OVP is inputted to the control circuit 12 and the peak current limiting control circuit 18, and the switch transistor in the boost circuit 11 is in the charging phase under control of a boost control signal Vcon and does not supply power to the output load Rout. In this case, the output load Rout is powered by the output capacitor Cout, and the output voltage VOUT is gradually decreased. When the output voltage VOUT is decreased to the lower threshold voltage $V_{OVPOUT}$, the over-voltage protection signal OVP changes from the high level to a low level, and the peak current limiting control circuit 18 generates a single pulse signal to perform current limiting control on the switch transistor in the boost circuit 11, such that a current-limiting current Ilimit flows through the switch transistor in the open-loop charge pump. In a time period of the single pulse signal, the current-limiting current Ilimit completely flows to the output capacitor Cout. In this way, the output voltage VOUT is increased in a smaller amplitude as compared with the case shown in FIG. 1, thereby increasing the ripple frequency of the output voltage VOUT.

Figure 4:
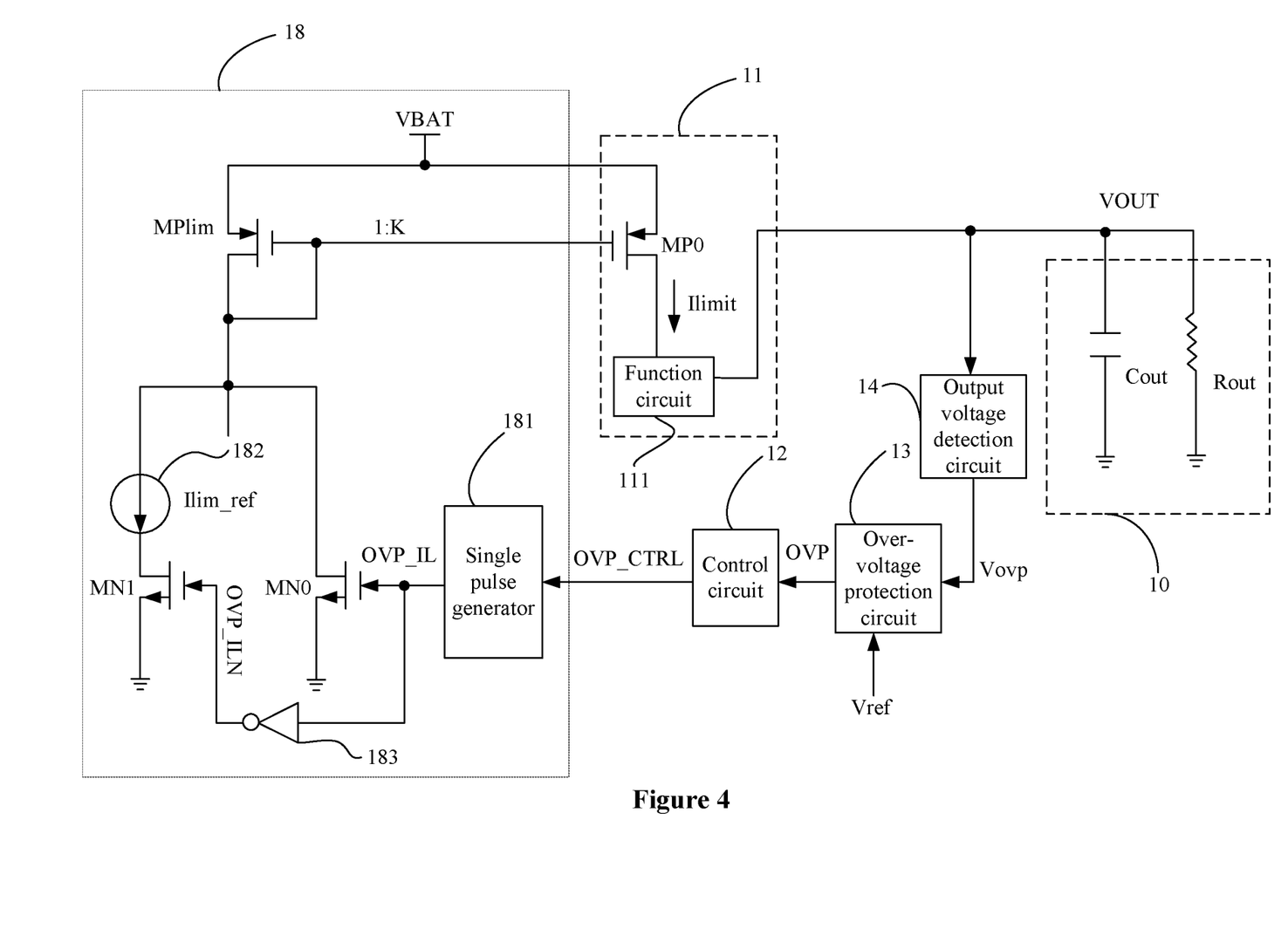
FIG. 4 is a schematic circuit diagram of a peak current limiting control circuit in the open-loop charge pump shown in FIG. 3.

Reference is made to FIG. 4, which is a schematic circuit diagram of a peak current limiting control circuit in the open-loop charge pump shown in FIG. 3. The peak current limiting control circuit 18 includes: a first switch transistor MPlim, a second switch transistor MN0, a third switch transistor MN1, and a single pulse generator 181. In an embodiment, the single pulse generator 181 is configured to output a pulse signal having a signal width of 0.5 µs. It should be noted that the signal width may be adjusted according to requirements, which is not limited to 0.5 µs.

A gate of the first switch transistor MPlim is connected to the control terminal of the boost circuit 11, a first electrode of the first switch transistor MPlim is configured to receive a power supply voltage VBAT, and a second electrode of the first switch transistor MPlim is connected to the gate of the first switch transistor MPlim. A gate of the second switch transistor MN0 is connected to an output terminal of the single pulse generator 181, a first electrode of the second switch transistor MN0 is grounded, and a second electrode of the second switch transistor MN0 is connected to the second electrode of the first switch transistor MPlim. A gate of the third switch transistor MN1 is connected to the output terminal of the single pulse generator 181 via a phase inverter 183, a first electrode of the third switch transistor MN1 is grounded, and a second electrode of the third switch transistor MN1 is connected to the second electrode of the first switch transistor MPlim via a current source 182.

An input terminal of the phase inverter 183 is connected to the output terminal of the single pulse generator 181, and an output terminal of the phase inverter 183 is connected to the gate of the third switch transistor MN1. That is, a single pulse signal OVP_ILN inputted to the third switch transistor MN1 and a single pulse signal OVP_IL inputted to the second switch transistor MN0 have the same amplitude and opposite phases. An input terminal of the single pulse generator 181 is connected to the output terminal of the control circuit 12.

In an embodiment, the first switch transistor MPlim is a PMOS transistor, and both the second switch transistor MN0 and the third switch transistor MN1 are NMOS transistors.

The boost circuit 11 includes a fourth switch transistor MP0 and a function circuit 111. A gate of the fourth switch transistor MP0 is the control terminal of the boost circuit 11, a first electrode of the fourth switch transistor MP0 is configured to receive the power supply voltage VBAT, and a second electrode of the fourth switch transistor MP0 is connected to the load circuit 10 via the function circuit 111. The boost circuit 11 may be implemented by an existing boost circuit, which is not described in detail herein.

The fourth switch transistor MP0 and the first switch transistor MPlim form a current mirror to limit an output current Ilimit of the second electrode of the fourth switch transistor MP0, so as to decrease the peak current. In an embodiment, the fourth switch transistor MP0 is a PMOS transistor.

In the open-loop charge pump according to the embodiment of the present disclosure, the over-voltage protection circuit 13 outputs the over-voltage protection signal OVP having a high level in a case that the output voltage VOUT is higher than the upper threshold voltage $V_{OVPIN}$, and outputs the over-voltage protection signal OVP having a low level in a case that the output voltage VOUT is lower than the lower threshold voltage $V_{OVPOUT}$.

In the open-loop charge pump according to the embodiment of the present disclosure, in a case that the over-voltage protection circuit 13 outputs the over-voltage protection signal OVP having a high level, the control circuit 12 controls, based on the over-voltage protection signal OVP, the single pulse generator 181 to output a positive pulse signal. The positive pulse signal is used to control the second switch transistor MN0 to be turned on, and the positive pulse signal is converted to a negative pulse signal via the phase inverter 183. The negative pulse signal is used to control the third switch transistor MN1 to be turned off, so as to control the fourth switch transistor MP0 to be in the charging phase.

The control circuit 12 controls the single pulse generator 181 to generate a set pulse signal by using a control signal OVP_CTRL.

In the open-loop charge pump according to the embodiment of the present disclosure, in a case that the over-voltage protection circuit 13 outputs the over-voltage protection signal OVP having a low level, the control circuit 12 controls, based on the over-voltage protection signal OVP, the single pulse generator 181 to output a negative pulse signal. The negative pulse signal is used to control the second switch transistor MN0 to be turned off, and the negative pulse signal is converted to a positive pulse signal via the phase inverter 183. The positive pulse signal is used to control the third switch transistor MN1 to be turned on such that the current source 182 provides a current-limiting current for the current mirror, so as to decrease the peak current.

Figure 5:
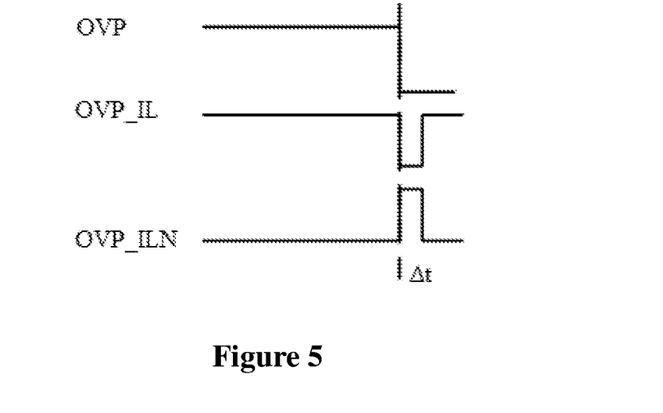
FIG. 5 is a schematic diagram showing waveforms of input and output signals of a single pulse generator.

In the embodiment shown in FIG. 4, the over-voltage protection circuit 13 compares the detection voltage Vovp outputted by the output voltage detection circuit 14 with the reference voltage Vref. When the output voltage VOUT exceeds the upper threshold voltage $V_{OVPIN}$, the generated over-voltage protection signal OVP is a high level. The over-voltage protection signal OVP is imputed to the control circuit 12 and the single pulse generator 181 in the peak current limiting control circuit 18, and a signal OVP_IL and an inversion signal OVP_ILN of the signal OVP_IL are generated, which are shown in FIG. 5. FIG. 5 is a schematic diagram showing waveforms of input and output signals of a single pulse generator. The signal OVP_IL and the signal OVP_ILN are respectively used to control the second switch transistor MN0 and the third switch transistor MN1. In a case that the open-loop charge pump operates in the over-voltage protection mode, the over-voltage protection signal OVP is a high level. In this case, the signal OVP_IL is a high level, the signal OVP_ILN is a low level, and the second switch transistor MN0 is turned on. The switch transistor in the boost circuit 11 is in a charging phase under control of the boost control signal Vcon, and does not supply power to the output load Rout. In this case, a load current is provided by the output capacitor Cout, and the output voltage VOUT is gradually decreased. When the output voltage VOUT is decreased to the lower threshold voltage $V_{OVPOUT}$ after a preset time period, the over-voltage protection signal changes to a low level, and a negative pulse signal OVP_IL and a positive pulse signal OVP_ILN having signal widths of Δt are generated by the single pulse generator 181. During the time period of Δt, the second switch transistor MN0 is turned off, the third switch transistor MN1 is turned on, and a current-limiting current Ilim_ref flows to the current mirror formed by the first switch transistor MPlim and the fourth switch transistor MP0. A current-limiting current limit flows from the fourth switch transistor MP0 after the current-limiting current Ilim_ref is mirrored by K times, which decreases a peak amplitude of the output voltage VOUT compared with the case shown in FIG. 1 that the peak current $I_{PEAK}$ flows from the open-loop charge pump.

For example, it is assumed that Δt is set as 0.5 μs, and a capacitance Cout of the output capacitor Cout is set as 5 μF. In the open-loop charge pump shown in FIG. 1, when the over-voltage protection signal OVP is changed from a high level to a low level, the peak current $I_{PEAK}$, which is up to 2 A, flows from the switch transistor in the boost circuit 11 to the output capacitor Cout. In this case, the peak voltage of the output capacitor Cout is expressed as:

$$\Delta V_{PEAK1} = I_{PEAK} * \Delta t / Cout = 200 \text{ mV}$$

If the load current Iload is 5 mA, a fall time of the output voltage VOUT is expressed as:

$$Tf1 = \Delta V_{PEAK1} * Cout / Iload = 0.2 \text{ ms}$$

Therefore, a frequency of the over-voltage protection signal OVP is expressed as fovp1=1/Tf1=5 KHz. The frequency is in the audio frequency range (from 20 Hz to 20 KHz), which results in the music noise and the poor audio quality, affecting the hearing effect.

In the open-loop charge pump shown in FIG. 4, when the over-voltage protection signal OVP is changed from a high level to a low level, a limited current Ilimit, such as 300 mA, flows from the switch transistor in the boost circuit 11 to the output capacitor Cout. In this case, the peak voltage of the output capacitor Cout is expressed as:

$$\Delta V_{PEAK2} = Ilimit * \Delta t / Cout = 30 \text{ mV}$$

If the load current Road is 5 mA, a fall time of the output voltage VOUT is expressed as:

$$Tf2 = \Delta V_{PEAK2} * Cout / Iload = 0.03 \text{ ms}$$

Therefore, a frequency of the over-voltage protection signal OVP is expressed as fovp2=1/Tf2=33.3 KHz. The frequency is out of the audio frequency range (from 20 Hz to 20 KHz), which does not affect the audio quality and the hearing effect.

Figure 6:
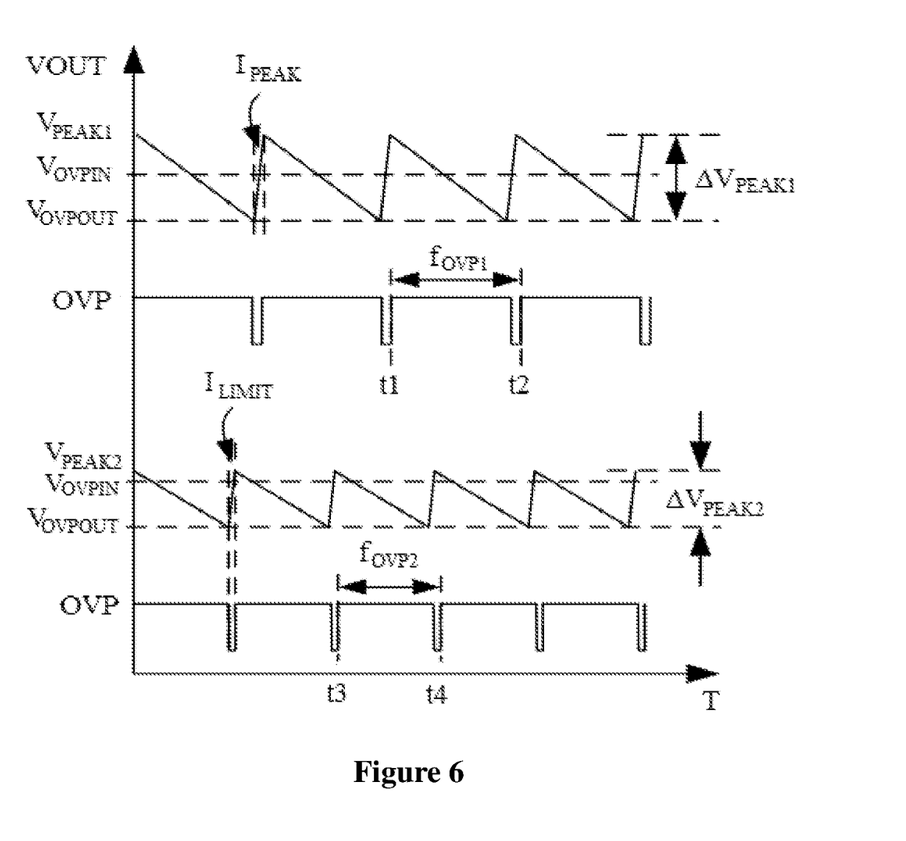
FIG. 6 is a timing diagram illustrating comparison between ripple frequencies of output voltages of the open-loop charge pumps shown in FIG. 1 and FIG. 4.

Reference is made to FIG. 6, which is a timing diagram illustrating comparison between ripple frequencies of output voltages of the open-loop charge pumps shown in FIG. 1 and FIG. 4. A timing diagram of a voltage signal of the open-loop charge pump shown in FIG. 1 is shown in the upper half of FIG. 6, and a timing diagram of a voltage signal of the open-loop charge pump shown in FIG. 4 is shown in the lower half of FIG. 6. The ripple frequency may be further increased, as long as a lower current-limiting current Ilimit is set. Therefore, it can be seen from output waveforms of the output voltage VOUT, with the open-loop charge pump for increasing a ripple frequency of an output voltage according to the embodiment of the present disclosure, the ripple frequency is increased to a frequency being out of the audio frequency range, thereby improving the audio quality and the hearing effect.

Based on the above description of the disclosed embodiments, those skilled in the art can implement or carry out the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. An open-loop charge pump, comprising:
    a control circuit comprising a first input terminal and an output terminal;
    a boost circuit comprising a control terminal and a load terminal;
    an output voltage detection circuit;
    an over-voltage protection circuit;
    a peak current limiting control circuit; and
    a clock circuit, wherein
    the load terminal of the boost circuit is connected to a load circuit comprising an output capacitor and an output load, and the load terminal of the boost circuit is connected to the first input terminal of the control circuit via the output voltage detection circuit and the over-voltage protection circuit, wherein the output voltage detection circuit is configured to output a detection voltage based on an output voltage at the load terminal, and the over-voltage protection circuit is configured to output an over-voltage protection signal based on a reference voltage and the detection voltage;
    the output terminal of the control circuit is connected to the control terminal of the boost circuit via the peak current limiting control circuit, and the control circuit drives the peak current limiting control circuit based on the over-voltage protection signal to control the boost circuit to be in a charging phase continuously or in a normal operation mode;
    in a case that the output voltage is higher than an upper threshold voltage, the boost circuit is continuously in the charging phase and does not supply power to the output load, and the output capacitor is discharged to supply power to the output load; and
    in a case that the output voltage is lower than a lower threshold voltage, the boost circuit is in the normal operation mode, wherein in a time period of the normal operation mode, the boost circuit switches between a discharging phase and the charging phase based on a frequency of the clock circuit, and when the boost circuit switches from the charging phase to the discharging phase, the peak current limiting control circuit decreases a peak current outputted from the boost circuit to increase a ripple frequency of the output voltage.

2. The open-loop charge pump according to claim 1, wherein the peak current limiting control circuit comprises:
    a first switch transistor;

a second switch transistor;
a third switch transistor; and
a single pulse generator, wherein
a gate of the first switch transistor is connected to the control terminal of the boost circuit, a first electrode of the first switch transistor is configured to receive a power supply voltage, and a second electrode of the first switch transistor is connected to the gate of the first switch transistor;
a gate of the second switch transistor is connected to an output terminal of the single pulse generator, a first electrode of the second switch transistor is grounded, and a second electrode of the second switch transistor is connected to the second electrode of the first switch transistor;
a gate of the third switch transistor is connected to the output terminal of the single pulse generator via a phase inverter, a first electrode of the third switch transistor is grounded, and a second electrode of the third switch transistor is connected to the second electrode of the first switch transistor via a current source, wherein an input terminal of the phase inverter is connected to the output terminal of the single pulse generator, and an output terminal of the phase inverter is connected to the gate of the third switch transistor; and
an input terminal of the single pulse generator is connected to the output terminal of the control circuit.

3. The open-loop charge pump according to claim 2, wherein the first switch transistor is a P-channel Metal Oxide Semiconductor (PMOS) transistor, and both the second switch transistor and the third switch transistor are N-channel Metal Oxide Semiconductor (NMOS) transistors.

4. The open-loop charge pump according to claim 2, wherein the boost circuit comprises:
a fourth switch transistor; and
a function circuit, wherein a gate of the fourth switch transistor is the control terminal of the boost circuit, a first electrode of the fourth switch transistor is configured to receive the power supply voltage, and a second electrode of the fourth switch transistor is connected to the load circuit via the function circuit; and
the fourth switch transistor and the first switch transistor form a current mirror to limit an output current of the second electrode of the fourth switch transistor, so as to decrease the peak current.

5. The open-loop charge pump according to claim 4, wherein the fourth switch transistor is a PMOS transistor.

6. The open-loop charge pump according to claim 4, wherein the over-voltage protection circuit outputs the over-voltage protection signal having a high level in a case that the output voltage is higher than the upper threshold voltage, and outputs the over-voltage protection signal having a low level in a case that the output voltage is lower than the lower threshold voltage.

7. The open-loop charge pump according to claim 6, wherein in the case that the over-voltage protection circuit outputs the over-voltage protection signal having a high level, the control circuit controls, based on the over-voltage protection signal, the single pulse generator to output a positive pulse signal; and
the positive pulse signal is used to control the second switch transistor to be turned on, and the positive pulse signal is converted to a negative pulse signal via the phase inverter, wherein the negative pulse signal is used to control the third switch transistor to be turned off, so as to control the fourth switch transistor to be in the charging phase.

8. The open-loop charge pump according to claim 6, wherein in the case that the over-voltage protection circuit outputs the over-voltage protection signal having a low level, the control circuit controls, based on the over-voltage protection signal, the single pulse generator to output a negative pulse signal; and
the negative pulse signal is used to control the second switch transistor to be turned off, and the negative pulse signal is converted to a positive pulse signal via the phase inverter, wherein the positive pulse signal is used to control the third switch transistor to be turned on such that the current source provides a current-limiting current for the current mirror, so as to decrease the peak current.

9. The open-loop charge pump according to claim 2, wherein the single pulse generator is configured to output a pulse signal having a signal width of 0.5 µs.

* * * * *